Sheet 1 - 2 Sheets.

J. G. W. & J. Hamilton & L. E. Hanson.

Ore Crusher.

No. 3,948. Reissued May 3, 1870.

Witnesses;
W. C. Clayton
Wm. Stewart

Inventors;
John Hamilton,
George W. Hamilton,
Joseph Hamilton,
and L. E. Hanson
by their attorneys
H. C. Clayton
& Co Sheet 2-2 Sheets.
J. G. W. & J. Hamilton & L. E. Hanson.
Ore Crusher.
No. 3,948. Reissued May 3, 1870.
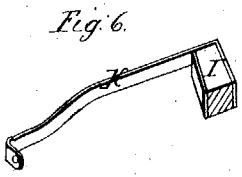
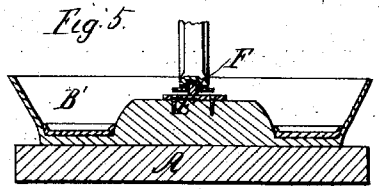
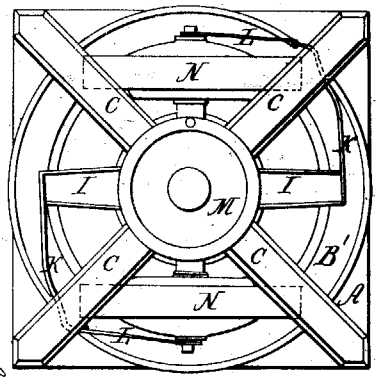
Witnesses;
W. C. Clayton
Wm. Stewart
Inventors;
John Hamilton,
George W. Hamilton,
Joseph Hamilton,
and L. E. Hanson,
by their attorneys
F. C. Clayton & Co.

United States Patent Office.

JOHN HAMILTON, GEORGE W. HAMILTON, AND JOSEPH HAMILTON, FOR THEMSELVES, AND JOSEPH HAMILTON, ASSIGNEE OF L. E. HANSON, OF WHEELING, WEST VIRGINIA.

*Letters Patent No.* 90,532, *dated May* 25, 1869; *reissue No.* 3,948, *dated May* 3, 1870.

IMPROVED ORE-CRUSHER.

The Schedule referred to in these Letters Patent and making part of the same

*To all whom it may concern:*

Be it known that we, JOHN HAMILTON, L. E. HANSON, GEORGE W. HAMILTON, and JOSEPH HAMILTON, of Wheeling, in the county of Ohio and State of West Virginia, have invented certain new and useful "Improvements in Ore-Crushers;" and we do hereby declare that the following is a full, clear, and exact description thereof, reference being had to the accompanying drawings and to the letters of reference marked thereon, in which—

Figure 4 is a plan view;

Figure 5 is a cross-section through the hopper or bottom, at *x x*, of fig. 2; and Figure 6 is a side view of one of the braces attached to the brace and axle.

To enable others skilled in the art to make and use our invention, we will describe its construction and operation, so that any one skilled in the art can construct and operate the same.

Figure 3:
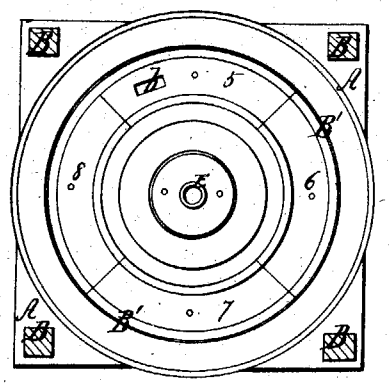
Figure 3 is a plan view of the bottom or hopper.
Figure 2:
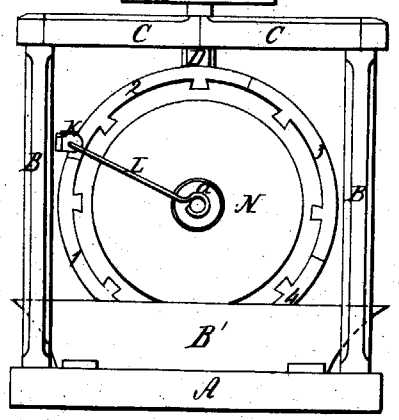
Figure 2 is a side view.
Figure 1:
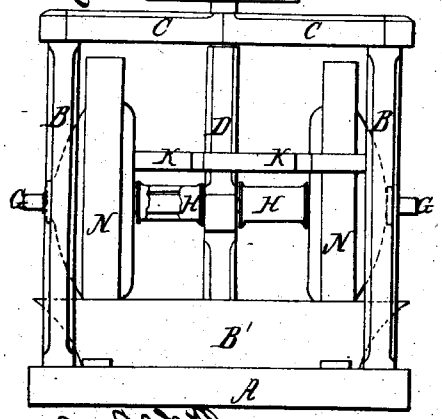
Figure 1 is a perspective view.

In the construction of our invention, in fig. 1—

A is the bottom, made of solid plank.

B B B B, four standards, rising up higher than the crushing-wheels.

Diagonally to these uprights are cross-bars C C, crossing each other in the center at right angles, and which constitute the frame-work of the machine.

D is an upright shaft, resting on the bottom, having a journal, E, attached to the bottom by means of screws, and which journal is detachable, so that when the spindle is worn out or broken, it can be easily removed, and another one substituted.

Fitting to this journal E is a journal-box, F, let into the lower end of the shaft, so that it can, when worn, be removed, and another journal-box inserted.

A straight shaft, G, passes at right angles to the upright shaft, and through it and which is the axle, on which the wheels revolve.

On this cross-shaft or axle are placed between the wheels and upright shaft, two sleeves, H H, which serve to keep the wheels in proper position in revolving, and to prevent them from running in toward the center.

Directly above this axle is an arm, T, upon the upright shaft, at right angles to the axle, and is to support the braces K K, which extend out beyond the wheels, and to which are attached rods L L, which are attached to the axle at each outer end, and are to hold the wheels on the axle.

The object of this invention is to provide a suitable machine for pulverizing iron ore in a dry state, to be used for a lining or "fix" for puddling or boiling-furnaces, pursuant to Letters Patent issued to one Hugh McDonald, bearing date October 17, 1865, and reissued January 23, 1866.

Prior to the said invention of the said Hugh McDonald, the lining or "fix" of puddling and boiling-furnaces had usually been made of lump ore, without pulverization, but of late years the said invention has gone into very general use, and the "fixing," as now used, consists of pulverized iron ore, either with or without the admixture of other materials, made into a pasty mass, and applied in the form of plaster. The introduction of said McDonald's invention into common and very general use at once created a demand for a machine to pulverize ore, for the purpose above mentioned.

It is essential, in order to form an adhesive pasty mass from the pulverized ore, that a portion of the ore, at least, be ground very fine. Stamping-machines and crushing-machines of various kinds were first tried, all of which, however, failed to pulverize the ore to a sufficient degree of fineness to make it adhesive; but when our machine was introduced, it was found to obviate, completely, this defect in all prior machines which had been used for the same purpose, and it has since been very extensively adopted, and is now in use in all, or nearly all iron manufactories which use the invention of McDonald, or any similar process for lining furnaces.

Our machine is constructed to operate on the same general principle as the old "arastra," long in use in gold-mining regions for crushing quartz-ore in a wet state, and of other machines of the same class, that have more recently been invented for similar purposes; but, in order to adapt our machine to the new use of pulverizing iron ore in a dry state, we have made certain improvements, which are hereinafter described.

To the wheels N N, which are made very heavy, are attached rims of chilled or hardened iron, (made as hard as possible.) These rims we cast in sections, 1 2 3 4, and on the inner side of each section are two dovetails, extending across the inner surface of the rim, which are fitted into corresponding grooves in the peripheries of the wheels, so that when said rims become worn by use, they may be easily removed, and new ones substituted.

It is manifest, however, that the rim of hard metal may be made all in one piece, instead of being made in sections, and instead of being attached to the main wheel by dovetail connections, as described, may be attached by other equivalent means, so as to be easily removed and replaced.

The pan or hopper B, in which the wheels revolve, is made dish-shaped, flaring out at the top, and may be varied in depth, as required.

In the center, where the journal on which the upright shaft rests, it is raised some distance above the bottom, on which the ore is crushed and ground.

The crushing-floor or track on which the wheels travel, is also made in sections, 5 6 7 8, of chilled or hardened iron, and snugly fitted into a recess formed to receive them, so that when worn out or broken they may be easily removed and replaced by others. It is manifest, also, that said crushing-floor may be made in a solid ring, instead of being made in sections, as shown.

A journal-box, *a'*, is let into the wheels, through which the axle passes, which also can be removed when worn out.

In the bottom of the pan or hopper, and in the path of the wheels is an aperture, *b*, connecting with a spout, to carry off the pulverized ore.

The wheels, in traveling round, will gradually work the pulverized ore down this aperture, but, if desired, a scraper may be added, attached to the shaft D by means of a suitable arm, to facilitate the movement of the pulverized ore to said aperture.

In the operation of our machine, the ore is placed in the pan or hopper in advance of the aperture *b*, (having reference to the course in which the wheels travel,) and power is applied to the driving-wheel, which causes the wheels N N to revolve, and, by the great weight of the same, the ore is soon crushed and pulverized, and gradually moved around to the said aperture *b*, through which it passes out, without any manual labor being required to remove it from the hopper. As the machine continues to run, ore is fed in from time to time, as required.

Without the removable rims to the grinding-wheels, and the removable floor or track in the hopper on which they travel, the crushing and grinding of the dry ore would, in a short time, so wear both the wheels and the hopper as to render them unfit for use, and thus destroy the most expensive parts of the machine; but by means of said detachable rims and track, we are enabled, at comparatively small expense, to repair the machine and make it as good as new, whenever impaired by wear.

One of the advantages in the construction of this machine consists in the axle being straight. It is simply pushed through the wheels, sleeves, shaft, and support-braces, without any lifting, and is, at any time, as easily detached.

Having thus described our invention, we do not claim the wheels, shaft, or hopper, separately or in combination; nor do we claim, broadly, the detachable rim of chilled or hardened iron on the grinding-wheels, as a similar detachable rim has been applied to a roller for breaking stones for macadamizing roads; but

What we do claim as our invention, and desire to secure by Letters Patent, is—

1. The combination of the detachable rims of chilled or hardened iron of the grinding-wheels with the detachable floor or track of the hopper, substantially as and for the purpose described.

2. The arrangement herein described of the arms I, secured to the upright shaft, the braces K K, extending out beyond the wheels, the rods L L on the axle G, and the detachable sleeves H H, for keeping the wheels in place, all constructed and operated substantially in the manner set forth.

JOHN HAMILTON.
L. E. HANSON.
GEO. W. HAMILTON.
JOSEPH HAMILTON.

Witnesses:
B. KAMMER,
WM. FASNACHEF.